United States Patent

Cella et al.

[11] Patent Number: 6,099,729
[45] Date of Patent: Aug. 8, 2000

[54] CORELESS NON-METALLIC FILTER ELEMENT

[75] Inventors: Albert F. Cella, Sylvania; Donald J. Gembolis, Toledo; Bruce E. Shane, Delta, all of Ohio

[73] Assignee: Parker-Hannifin Corporation, Cleveland, Ohio

[21] Appl. No.: 08/792,036

[22] Filed: Jan. 31, 1997

Related U.S. Application Data

[60] Provisional application No. 60/013,580, Mar. 1, 1996.

[51] Int. Cl.[7] .................................................. B01D 29/21
[52] U.S. Cl. .......................... 210/315; 210/457; 210/490; 210/493.2; 210/497.01
[58] Field of Search .............................. 210/493.1, 493.2, 210/493.5, 497.01, 497.2, 442, 450, 490, 491, 457, 458, 438, 323.2, 342, 315, 335, 337, 338; 55/498, 521

[56] References Cited

U.S. PATENT DOCUMENTS

| | | |
|---|---|---|
| 2,726,184 | 12/1955 | Cox et al. . |
| 2,771,156 | 11/1956 | Kasten et al. . |
| 3,174,625 | 3/1965 | Briggs . |
| 3,189,179 | 6/1965 | McMichael . |
| 3,306,794 | 2/1967 | Humbert, Jr. . |
| 3,386,583 | 6/1968 | Merten . |

(List continued on next page.)

FOREIGN PATENT DOCUMENTS

| | | | |
|---|---|---|---|
| 63-59305 | 3/1988 | Japan .................................... | 210/490 |
| 1-164416 | 6/1989 | Japan . | |
| 2 192 810 | 1/1988 | United Kingdom . | |
| 2226254 | 6/1990 | United Kingdom ................... | 210/450 |
| 2 274 604 | 2/1995 | United Kingdom . | |
| 2 247 189 | 3/1995 | United Kingdom . | |

OTHER PUBLICATIONS

Disclovery Series Eco–Pak Coreless Filter Elements, Vickers, Inc, 1996.

*Primary Examiner*—Matthew O. Savage
*Attorney, Agent, or Firm*—Christopher H. Hunter

[57] ABSTRACT

A coreless filter element for a filter housing includes cylindrical filter media having longitudinally-extending pleats extending from one end cap on the filter media to another end cap on the filter media. The filter media is preferably a multi-layered structure with an outer support mesh layer attached to an inner prefiltration layer by an intermediate adhesive web layer. An inner wrap of a porous fibrous filter media is provided within the central cylindrical cavity of the pleated filter media. The wrap has a cylindrical form with an outer surface which is joined to the inner pleat peaks of the media such as with one or more beads of adhesive, or with a continuous adhesive layer applied to the outer surface of the support wrap. The filter element with inner support wrap can be easily located over a metal support core integral with the filter housing, and provides structural integrity for the pleats of the filter media. According to another embodiment, a series of circumferential bands formed from porous or imperforate material can be provided within the central cylindrical cavity and adhesively joined to the inner pleat peaks of the filter media. In either embodiment, the inner support wrap or bands provide structural integrity for the pleats, provides a filter element which is easily manufactured, and which allows the filter element to be easily located over the support core in the filter housing, and removed therefrom when the filter element becomes spent. The coreless filter element is also preferably formed from components which can be easily incinerated or disposed of in a landfill.

58 Claims, 3 Drawing Sheets

U.S. PATENT DOCUMENTS

| | | |
|---|---|---|
| 3,417,870 | 12/1968 | Bray . |
| 3,457,339 | 7/1969 | Pall et al. . |
| 3,520,417 | 7/1970 | Durr et al. . |
| 3,570,675 | 3/1971 | Pall et al. . |
| 3,675,776 | 7/1972 | Campo . |
| 3,752,321 | 8/1973 | McLaren . |
| 4,046,697 | 9/1977 | Briggs et al. . |
| 4,102,792 | 7/1978 | Harris . |
| 4,154,688 | 5/1979 | Pall . |
| 4,184,966 | 1/1980 | Pall . |
| 4,186,099 | 1/1980 | Henschel, Jr. et al. . |
| 4,211,543 | 7/1980 | Tokar et al. . |
| 4,402,830 | 9/1983 | Pall . |
| 4,726,901 | 2/1988 | Pall et al. . |
| 4,882,056 | 11/1989 | Degen et al. . |
| 5,015,375 | 5/1991 | Fleck . |
| 5,039,413 | 8/1991 | Harwood et al. . |
| 5,084,178 | 1/1992 | Miller et al. . |
| 5,130,023 | 7/1992 | Feint . |
| 5,171,342 | 12/1992 | Trefz . |
| 5,211,846 | 5/1993 | Kott et al. . |
| 5,250,179 | 10/1993 | Spearman . |
| 5,252,207 | 10/1993 | Miller et al. . |
| 5,279,731 | 1/1994 | Cook et al. . |
| 5,340,479 | 8/1994 | Szczepanski et al. . |
| 5,399,264 | 3/1995 | Pulek et al. . |
| 5,409,642 | 4/1995 | Allen et al. . |
| 5,423,984 | 6/1995 | Belden . |
| 5,427,597 | 6/1995 | Osendorf ................................. 55/487 |
| 5,443,721 | 8/1995 | Kelada et al. . |
| 5,468,382 | 11/1995 | Cook et al. . |
| 5,536,290 | 7/1996 | Stark et al. ............................. 55/498 |
| 5,632,791 | 5/1997 | Oussoren et al. ...................... 55/486 |
| 5,653,831 | 8/1997 | Spencer .............................. 210/493.2 |
| 5,681,461 | 10/1997 | Gullet et al. . |
| 5,698,097 | 12/1997 | Gebert et al. ........................ 210/248 |
| 5,868,932 | 2/1999 | Guichaoua et al. .................. 210/442 |

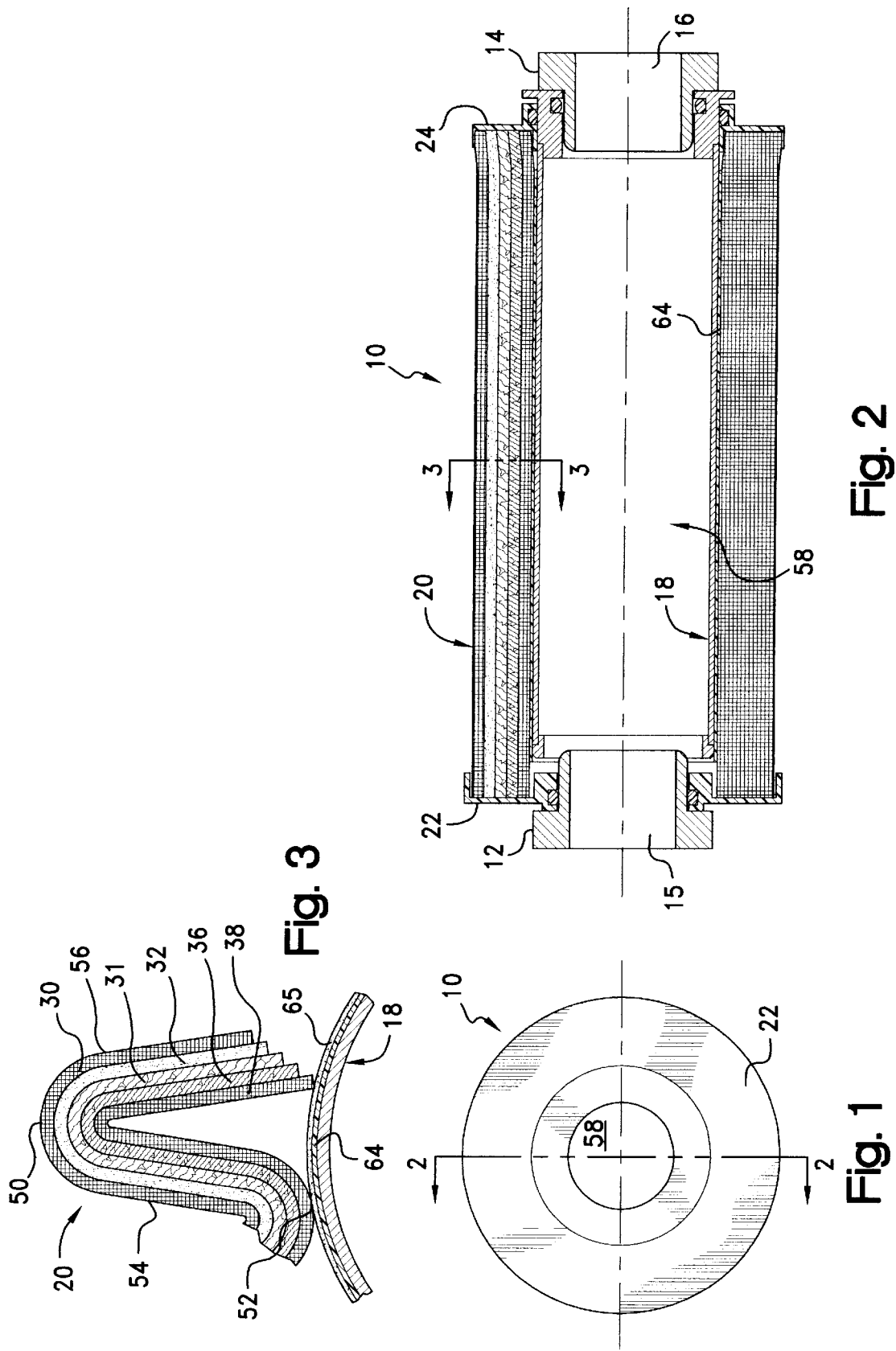

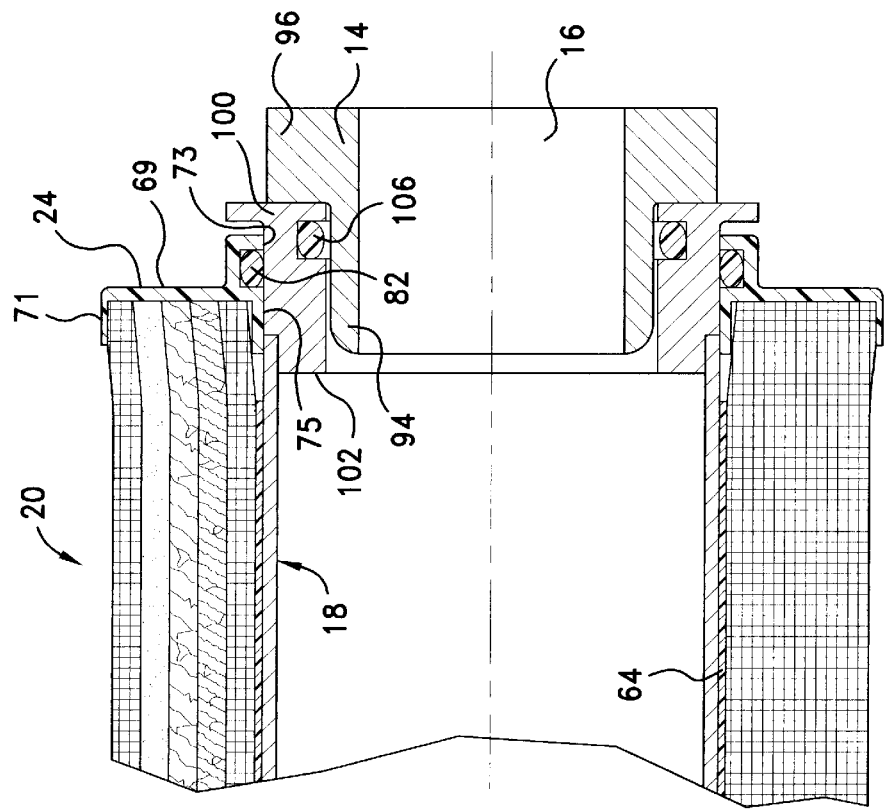
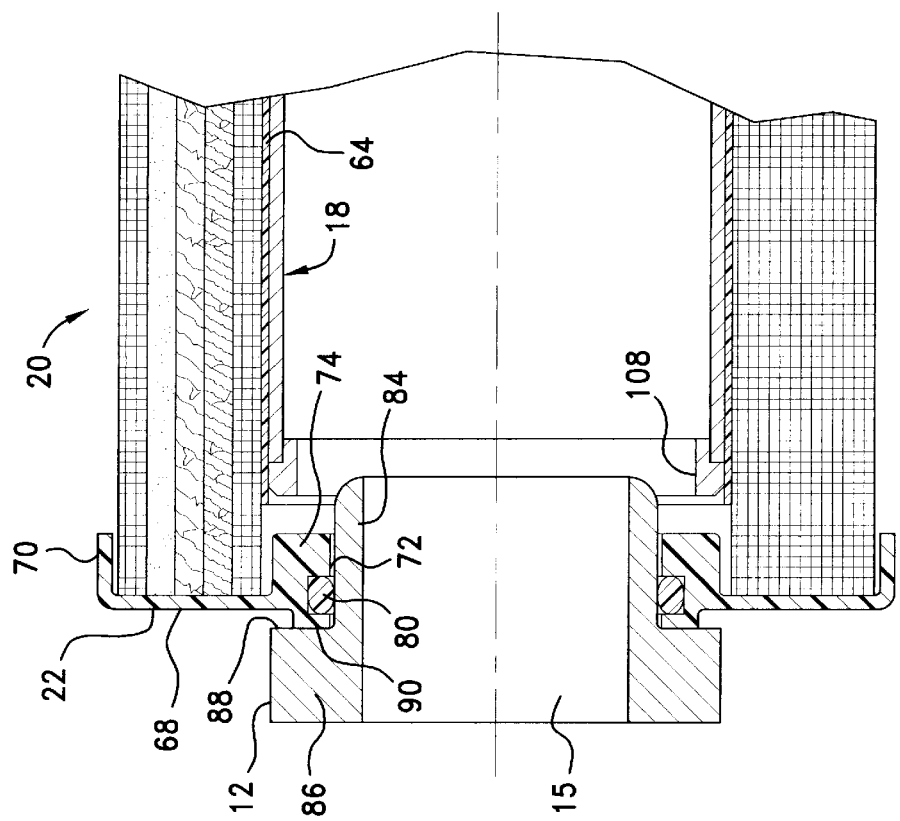

CORELESS NON-METALLIC FILTER ELEMENT

This application claims the benefit of U.S. Provisional Application No. 60/013,580 filed on Mar. 1, 1996.

FIELD OF THE INVENTION

The present invention relates generally to filter elements, and more particularly, to a coreless filter element, that is, a filter element which can be located over a rigid support core integral with the filter housing, and can be removed from the support core and replaced when the filter element becomes used or spent.

BACKGROUND OF THE INVENTION

Some filter elements include a perforated rigid support core surrounded by tubular or cylindrical fibrous filter media. Imperforate rigid plastic or metal end caps are typically located at opposite ends of the filter media, and at least one of the end caps has a central opening to allow fluid to flow into or out of the inner cavity of the filter element. The filter element can be located in a filter housing, with the element locators (fluid passages) in the housing received in the opening(s) in the end caps. In some instances, the filter media is pleated, that is, the filter media is formed with longitudinally-extending pleats extending from end cap to end cap. The pleats provide for a larger surface area in contact with fluid to be filtered, and hence increase the particle separation efficiency of the filter element. Fluid to be filtered either passes radially inward through the filter media and then outwardly through the opening in the end cap, or inwardly through the opening in the end cap and then radially outward through the filter media.

The support core for the filter element generally provides support for the pleated filter media, although certain filter media structures have been developed whereby the filter material is of such a rigidity that it is self-supporting. Self-supporting filter elements can require relatively thick media layers, epoxy-coated steel mesh layers, deep grooves in the exterior surface to increase the surface area, shallow pleat configurations, and/or a high resin content, all of which can increase the complexity, time, and cost associated with manufacturing the filter element. Self-supporting filter elements are therefor not appropriate for all filter applications. As such, many applications require a central support core for support of the filter media.

Applicants believe that filter elements with a central support core have typically been manufactured with the core formed integrally with the housing, that is, with the core fixedly attached to the surrounding filter media, such as by attachment to the opposing end caps (see, e.g., U.S. Pat. No. 4,033,881). As such, when the filter element becomes clogged or spent, the entire element, with support core, must be removed and replaced. Many fibrous filter elements are not designed to be cleaned and reused, and as such, must be disposed of in an appropriate location, such as in a landfill. The support core is not easily removed from the filter media, and as such, the core is disposed of at the same time. These two components (filter media and core) take up valuable space in landfills. Additional disposal issues can be raised when the support core is formed from a noncombustible material, such as metal, which can require the use of expensive compacting machinery for proper disposal. Moreover, the replacement filter element has costs (labor and material) associated with both the fresh filter media and the support core, particularly if the core is metal.

Certain filter elements have been developed in an attempt to separate (remove) the spent filter media from the support core when the filter media is replaced. These "green" filter elements include, for example, Mills, U.S. Pat. No. 5,476,585, which shows a permanent metal support core in the housing surrounded by a removable pleated filter element. A spiral wrap is disposed around the exterior surface of the filter media to provide resistance against axially-directed forces. End cap portions on the filter media and on the core are fluidly sealed together and can be separated to remove the spent filter media from the core. Tokar, et al., U.S. Pat. No. 4,211,543 also shows a pleated filter media having an outer liner supporting the outer pleat peaks of the media. This reference also discloses that the filter media can be slid onto a conically-shaped safety sleeve assembly, which has been initially located over a rigid support core. Kott et al., U.S. Pat. No. 5,211,846, discloses to provide circumferential straps around the exterior of the coreless filter element to maintain the cylindrical shape of the filter media and to maintain separation of the pleats. On the other hand, Gewiss et al., U.S. Pat. No. 5,413,712 discloses to locate pleated (zig-zag) filter media directly over a rigid support core with no external wrap.

While the Mills, Tokar, Kott and Gewiss patents appear to allow the filter media to be removed from a support core permanently affixed the filter housing, it is believed that the filter media can be difficult to locate over the core, particularly if the filter media is pleated because the inner peaks of the pleats can become distended or bent when the filter element is closely received over the support core. Further, the pleated filter media requires some structure to hold the pleats in fixed, closely-held relation with one another such that "lay-over", i.e., the folding over of the pleats against one another, is prevented. While the Mills, Tokar and Kott patents teach to provide an exterior wrap around the pleats, wrapping the exterior surface, particularly with a helical or spiral wrap, can be time-consuming and require significant amounts of wrap material. An exterior wrap can also have issues with appearance. The Gewiss patent, on the other hand, does not provide an outer wrap, and so can be unacceptable for many applications where a significant pressure drop across the element is expected.

As such, it is believed that the prior known designs for filter elements have not provided a coreless filter element which can be simply and easily located over a support core in the housing and removed from the housing when spent and replaced, which has a filter media structure which maintains the structural integrity of the pleats during use, and which is relatively simple and cost-effective to manufacture. Moreover, it is believed that there is a demand in the industry for a coreless filter element which does not have an outer wrap around the pleats, does not incorporate the drawbacks associated with many of the "self-supporting" types of filter elements, and which can be easily disposed of in landfills.

SUMMARY OF THE INVENTION

The present invention provides a new and unique coreless filter element which can be located over a rigid support core integral with the filter housing, and can be easily removed from the support core and replaced when the filter element becomes spent or used. The filter element has filter media with a structure which maintains its structural integrity during use without the need for an outer wrap, and which is relatively simple and cost-effective to manufacture. The filter element does not incorporate metal components, which thereby allows the element to be disposed of in commercial landfills such as by biodegration or incineration.

According to the principles of the present invention, the filter element comprises cylindrical filter media having longitudinally-extending pleats extending from one end of the filter media to the other end. Imperforate plastic end caps are disposed at each end of the filter media. According to one embodiment, an inner cylindrical support wrap of a porous, fibrous filter media is disposed centrally within the filter media and has an outer surface which is joined to the inner peaks of the pleats. The support wrap is preferably a non-woven polyester or other spun-bonded material, and can be joined to the inner peaks such as by adhesive applied in one or more beads on the outer surface of the wrap, or in a layer across the entire surface of the wrap. The support wrap preferably extends along substantially the entire length of the filter media between the end caps and fixidly locates the pleats with respect to one another for structural integrity. The support wrap also allows the filter element to be easily slid onto or off of a rigid support core without damaging the pleated media.

The filter element of the present invention is also relatively easy to manufacture with an inner support wrap. The support wrap is preferably initially disposed over a mandrel, with the side edges of the support tube being overlapped. Adhesive is then applied around the outer surface of the support wrap in one or more beads, or in a layer across the entire surface. The corrugated filter media is then located over the support tube in a cylindrical form, with the inner pleat peaks being adhesively joined to the support tube. The side edges of the filter media are then attached together using, e.g., a band or ribbon of adhesive. The end caps are then located on opposite ends of the filter element to provide additional structural integrity for the filter element, and allow the filter element to be located within the element locators in the filter housing.

According to another embodiment of the present invention, one or more support bands are disposed around the inner circumference of the pleated filter media. Preferably three bands are provided, with one band located close to each end of the filter media, and with the remaining band at about the midpoint of the filter media. The bands are preferably formed from an imperforate material, such as nylon, but can also be formed from fibrous filter material similar to the support wrap. The bands are joined to the inner pleat peaks by adhesive applied to the outer surface of the bands, and can extend in an annulus around the inner peaks of the pleats, or in a spiral or helical fashion.

In either of the embodiments described above, the inner support wrap or bands provide structural integrity for the pleats and allow the filter element to be easily manufactured using common techniques. The wrap or bands also allow the filter element to be easily located over a support core integral with a filter housing, and removed from the core and replaced when the filter element becomes used or spent.

The filter media of the present invention is preferably a multilayered filter media structure. Specifically, the filter media preferably has an outer support mesh layer, an adhesive web layer, a microfiber capacity layer (prefiltration layer), a microfiber filtration layer, and finally, an inner support mesh layer, all disposed in adjacent, surface-to-surface contact with one another. The adhesive web layer is preferably a non-woven, polyester-based thermoplastic which joins the outer support mesh layer to the prefiltration layer and also provides structural integrity for the pleated structure of the filter media when the filter media is under pressure. This preferred filter media structure can be disposed of in a landfill such as by biodegration or by incineration. While one preferred form of the filter media structure is thus described, it should be apparent that the filter element can be used with other types of pleated filter media structures, as should be apparent to those skilled in the art.

As such, the present invention provides a filter element which can be simply and easily located over a support core integral with the filter housing, and easily removed and replaced when the filter element is spent. The filter element has a filter media structure which maintains the structural integrity of the pleats during use, and which is relatively simple and cost-effective to manufacture. Further, the filter element is formed from biodegradable or combustible components which allow the filter element to be relatively easily disposed of in commercial landfills without significant expense, such as without the use of expensive compacting machinery.

Other features and advantages of the present invention will become further apparent upon reviewing the following specification and attached drawings.

BRIEF DESCRIPTION OF THE DRAWINGS

FIG. 1 is a left end view of a filter element constructed according to the principles of the present invention, the right end view being smaller;

FIG. 2 is a cross-sectional side view of the filter element taken substantially along the plane described by the lines 2—2 of FIG. 1, illustrating the filter element disposed between opposite element locators in a filter housing and showing a first embodiment of the filter element with inner support wrap;

FIG. 3 is a cross-sectional side view taken substantially along the plane described by the lines 3—3 of FIG. 2, illustrating the pleat section of the filter element;

FIG. 4 is an enlarged cross-sectional view of one of the end cap structures of the filter element of FIG. 2;

FIG. 5 is an enlarged cross-section the other of the end cap structures of FIG. 2.

DETAILED DESCRIPTION OF THE PREFERRED EMBODIMENT

Figure 6:
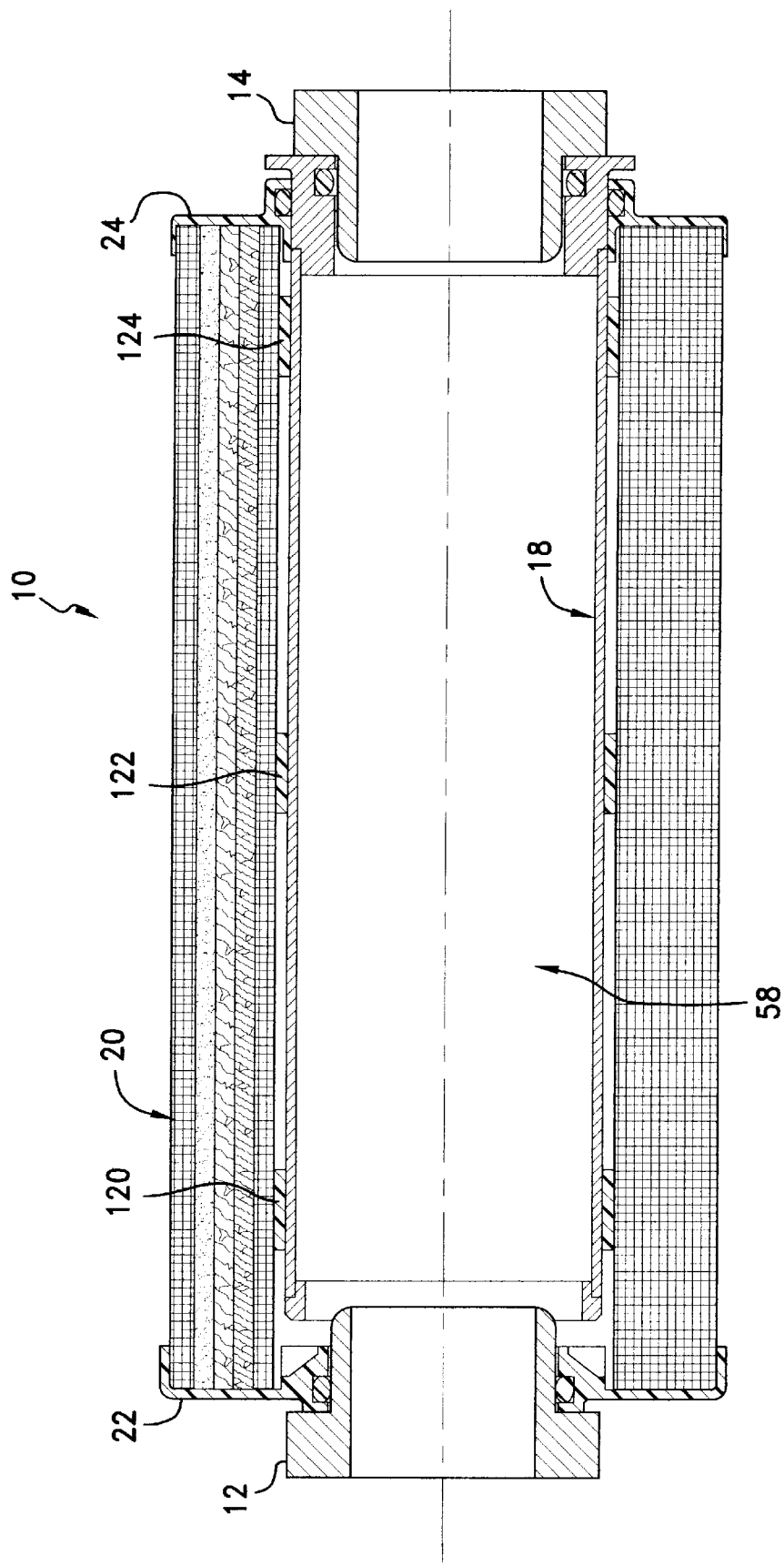
FIG. 6 is a cross-sectional configuration of a filter element similar to FIG. 2, but illustrating a second embodiment of the filter element with inner plural support bands.

Referring to the drawings, and initially to FIGS. 1–3, a filter element constructed according to the principles of the present invention is indicated generally at 10. The filter element 10 is designed to be located within a filter housing of a filter assembly, and to receive at least one element locator of the filter housing. A pair of element locators are identified at 12 and 14 in FIG. 2 disposed co-axial with one another at opposite ends of the filter element. Each element locator has a central fluid passage 15, 16, respectively, for directing fluid into or out of the filter element. A perforated metal support core, indicated generally at 18, is attached to element locator 14 and extends centrally within the filter housing. As will be described herein in more detail, the support core 18 removably receives the filter element 10.

The filter element 10 includes a filter media structure, indicated generally at 20, which preferably has a cylindrical form with opposite ends enclosed by end caps 22, 24. One preferred structure for the filter media is a multi-layered structure illustrated in FIG. 3. This multi-layered structure includes an outer support mesh or screen 30 formed from a thermoplastic synthetic resinous material, such as nylon or polyester, which can be woven or extruded. Other conventional thermoplastic synthetic resinous material can also be employed for the outer support mesh, as should be known to those skilled in the art. In any case, the support mesh should have sufficient strength to withstand differential fluid pressure across the filter element.

A microfiber capacity layer 31, also referred to as a prefilter layer, is located inside of the outer support mesh 30. The prefilter layer increases the dirt holding capacity of the filter element, and preferably is formed from borosilicate microglass fibers with acrylic binder. Again, other conventional materials can be used for the capacity layer, as should also be known to those skilled in the art.

Disposed between and immediately adjacent the inner surface of the outer support mesh 30 and the outer surface of the prefilter layer 31, is an adhesive web layer 32. The adhesive web layer preferably comprises a non-woven, polyester-based thermoplastic adhesive. The adhesive is heat sensitive and can be heat activated to i) join the outer support mesh to the capacity layer, and ii) facilitate maintaining the shape and structural integrity of the pleats after the web has thermally set. Preferable adhesive web material for the present invention is commercially available under model/designation Nos. SH 4200 and SH 4275 from Applied Extrusion Technologies, Inc. of Middletown, Del.

Immediately adjacent the inner surface of the capacity layer 31 is a microfiber filtration layer 36. The microfiber filtration layer is preferably comprised of the same material as the prefiltration layer, for example borosilicate microglass fibers with acrylic binder, but with a finer fiber or tighter structure than the prefiltration layer. Generally, the microfiber filtration layer defines the filtration efficiency of the filter element, and is generally about ten times the filtration efficiency of the prefiltration layer.

Immediately adjacent the inner surface of the filtration layer 36 is an inner support mesh layer 38. The inner support mesh layer 38 also preferably comprises the same material as in the outer support mesh layer 30, such as a thermoplastic synthetic resinous material which can be woven or extruded.

The thickness and porosity of the layers described above can vary depending upon the particular filtering application, and can be determined using simple experimentation. Further, as should be apparent to those skilled in the art, the preferred filter media structure described above is a combustible or biodegradable structure such that the filter media can be relatively easily disposed of in a commercial landfill. However, while the filter media structure 20 is preferably formed in the multi-layered structure described above, it should be apparent to those of ordinary skill in the art that the filter media structure can have other known single or multi-layered structures.

In any case, the filter media 20 is preferably pleated, that is, the filter media includes axially-extending pleats extending from end cap 22 to end cap 24. Each pleat has a radially outer pleat peak (open end), such as indicated at 50, and a radially inner pleat peak (closed end), such as indicated at 52. Each pleat also includes sidewalls, such as illustrated at 54 and 56, which together with the inner pleat peaks 50 and outer pleat peaks 52 define a series of radially-outward opening pleat cavities around the circumference of the filter element. The cylindrical pleated filter media also defines a cylindrical cavity, indicated generally at 58 in FIG. 1, centrally within the filter element. The techniques for pleating or corrugating the filter media are conventional in nature, and can include hand-forming or forming using a pleat machine.

To provide rigidity and structural integrity for the pleated filter media, an inner support wrap, indicated at 64 in FIGS. 2 and 3, is disposed within the cylindrical cavity of the filter element. Inner support wrap 64 preferably comprises a porous, fibrous filter media of a non-woven thermoplastic synthetic resin, such as polyester. The inner support wrap is preferably a spun-bonded material. A "spun-bonded" material can be prepared by depositing extruded thermoplastic synthetic resin filaments into a non-woven mat while the filaments are in a soft or partially molten form. The soft fibers generally thermally adhere to one another, i.e., melt bond, and when cooled, form an integral mass of non-woven filamentary structure. The inner-support wrap can also be formed from spun-bonded glass fibers, although polyester fibers are preferred. Support wrap 64 preferably has a permeability of at least ten times the permeability of the filter media 10, and does not appreciably affect the pressure drop across the filter element. As should be apparent from the above, the support wrap is also preferably formed from a combustible or incineratable material, similar to the material forming the filter media, such that the composite structure can be relatively easily incinerated or disposed of in a commercial landfill.

The support wrap 64 is formed in a cylindrical or tubular form, with the outer surface of the support wrap being joined to the inner pleat peaks 52 of the pleats. Preferably, the support wrap 64 is joined to the inner pleat peaks by conventional adhesive which can be applied to the outer surface of the support wrap in one or more beads (circumferentially or helically applied), or alternatively, applied continuously in a coating or layer across the entire outer surface of the support wrap. A layer of adhesive is indicated at 65 in FIG. 3. The adhesive bonds the inner pleat peaks to the support wrap, which fixes the inner pleat peaks with respect to one another and provides rigidity and structural integrity for the pleated filter media. The support wrap is of course unattached and is spaced from the filter media at the locations between the pleats. The ends of the support wrap are preferably spaced a short distance from the ends of the filter media such that the adhesive for the end caps can easily bond to the filter media in layers and the end caps can be securely bonded to the ends of the filter media. Otherwise, the support wrap extends along the entire axial length of the filter media.

The filter element is designed to be manufactured using common manufacturing techniques. For example, the inner support wrap can be wound around a mandrel, with the side edges of the support wrap overlapping one another. Although not necessary, the overlapping side edges can be adhesively secured together. A mass of adhesive can then be applied across the outer surface of the support wrap, such as in one or more beads, or in a continuous layer across the entire outer surface of the support wrap. The adhesive is preferably a commercially-available adhesive, such as a two-part urethane or epoxy with a catalyst which is heat or air curable, or can be other conventional adhesives, such as a single component adhesive of heat curable urethane or epoxy. Appropriate adhesives are well known to those skilled in the art. The pleated filter media can then be disposed in surrounding relation to the support wrap in a cylindrical form. The side edges of the filter media can be secured to one another, such as by a band or strip of adhesive applied along the adjacent side edges, as is also well-known in the art. The inner support wrap allows the preassembled filter media to be easily removed from (slid off) the mandrel and retain its cylindrical form.

As illustrated in FIGS. 4 and 5, end caps 22 and 24 are then located on the opposite end of the filter media. The end caps are preferably formed from conventional end cap material, for example a thermoplastic such as injection-molded nylon, or other material which is combustible and/or biodegradable, and which can be readily incinerated or disposed of in a landfill. The end caps are adhered to the ends of the filter media using an appropriate adhesive or potting compound. End caps 22 and 24 preferably both include imperforate annular disks 68, 69, respectively, disposed against the ends of the filter media 20. An outer annular flange extends axially inward around the periphery of each end cap, partially along the outer surface of the filter media. Specifically, outer annular flange 70 on end cap 22 extends inwardly from disk 68, while outer annular flange 71 on end cap 24 extends inwardly from disk 69. Each end cap also includes a central opening for receiving an element locator of the filter housing. Specifically, end cap 22 includes central opening 72 receiving element locator 12, while end cap 24 includes central opening 73 receiving element locator 14. Of course, if only one element locator is present, then one of the end caps can be a continuous uninterrupted disk, with no central opening. In any case, each end cap preferably includes an inner annular flange portion 74, 75, respectively, surrounding the opening in the end cap. The annular flanges also extend axially inward partially along the inner surface of the filter media.

As indicated previously, the support wrap does not extend out entirely to the ends of the filter media, but rather terminates at an axial location spaced from the ends of the filter media and also from the inner annular flange of the end cap. The spacing of the support wrap from the ends of the filter media allows the end caps to be easily located on the ends of the filter media and the adhesive to securely attach the end caps to the layers of the media. The inner annular flanges on the end caps preferably have about the same radial thickness (0.030 inches) as the support wrap, such that a substantially flush and continuous inner surface on the filter media is provided.

Each inner flange 74, 75 on the end caps also has a radially-inward facing groove which receives an elastomeric O-ring 80, 82, respectively. Each O-ring seals against the element locator for the housing to provide a fluid-tight seal between the filter element and the filter housing at both ends of the filter element. While the element locators can of course have different configurations depending upon the particular application, the element locator 12 illustrated in FIG. 4 has a cylindrical sleeve or collar 84 with an outer smooth surface which is sealed by O-ring 80 of end cap 22. Element locator 12 also includes an outwardly-projecting shoulder 86 with a flat inner surface 88 which can abut the outer surface 90 of flange 72, however, O-ring 80 allows flange 72 to be located along sleeve 84 at any axial location, and still maintain a proper seal between the filter element and the end cap.

At the opposite end of the filter element illustrated in FIG. 5, element locator 14 preferably has substantially the same structure as the element locator 12, that is, a cylindrical sleeve or collar 94 with a smooth exterior surface and an outwardly projecting shoulder 96. However, instead of O-ring seal 82 being sealed directly to collar 94, O-ring seal 82 can be sealed to the outer surface of the cylindrical inner support core 18. Specifically, inner support core 18 has an outer annular flange 100 preferably formed of the same material as the support core (metal) and secured at one end thereto such as by welding. The inner support core 18 can received around the annular flange and located within an annular channel formed at the inner end 102 of the flange. The annular channel provides that the exterior surface of flange 100 is substantially flush with the exterior surface of core 18. Flange 100 in turn is attached in sealed relation to element locator 14. Specifically, flange 100 can have an inner annular groove which receives an elastomeric O-ring 106. O-ring 106 seals against the outer surface of collar 94 on element locator 14. Flange 100 can be secured to element locator 14 such as by the compressive force of O-ring 106, or by other means which allows the support core to be removed from the element locator. Of course, inner support core 18 can also be formed in one piece or otherwise permanently secured to element locator 14 if the application so dictates, however, the removable end flange 100 on the support core allows the coreless filter element to be retro-fitted to existing filter housing designs, and also to be easily removed and inspected, if necessary.

As indicated above, the support tube is preferably comprised of metal and is formed in a cylinder by bringing opposite side edges of a sheet of perforated metal together and securing the edges together by, e.g., welding. A second annular flange 108 is preferably formed of the same material as the support core (metal) and secured to the other end of the core such as by e.g., welding. The support core 18 can also be received in an inner annular groove on the second annular flange such that the outer surface of the support core is substantially flush with the second annular flange. First annular flange 100 and second annular flange 108 provide smooth distal ends for the support core so as not to catch or tear the support wrap. However, smooth ends could also be provided using other techniques such as coining or crimping the ends of the support core over to form rolled edges.

To assemble filter element 20 in the filter housing, the inner support core 18 is initially secured to element locator 14. Next, filter element 20 is disposed over the support core 18, with end cap 24 being first received over the support core, and inserted over the support core until O-ring 82 seals against flange 100. Filter element 20 slides smoothly and cleanly over the inner support core by virtue of the smooth interior surface of support wrap 64, with the support wrap acting as a spacer to allow end cap 24 to slide easily past the support core. Preferably, when assembled, support wrap 64 is in adjacent, closely surrounding relation with inner support core 18 such that the inner support core provides longitudinal and radial support for filter media 20. In addition, support wrap 64 prevents the pleated media from directly contacting the inner support core, and catching or binding along the support core as the filter element is inserted. Finally, the opposite element locator 12 is attached to the filter element, with the O-ring seal 80 on end cap 22 sealing against element locator 12. Although not shown, element locator 12 can be incorporated into a removable end cap of the filter housing.

In removing a spent or used filter element from the housing, the above process is reversed, that is, element locator 12 is detached from the filter element, and the filter element is slid off the inner support core 18. Again, the filter element can be removed in a smooth and easy manner because of the support wrap 64 sliding easily against the inner support core 18.

According to another embodiment of the present invention, as illustrated in FIG. 6, the filter element 10 can alternatively include one or more support bands extending circumferentially around the inner surface of the filter media in the cylindrical cavity 58. For example, FIG. 6 illustrates three separate annular support bands 120, 122 and 124 disposed in spaced-apart relation around the inner surface of the filter media. Support band 120 can be located close to one end of the filter media (proximate end cap 22), support band 124 can be located close to another end of the filter media (proximate end cap 24) and support band 20 can be located between support band 120 and support band 124 at approximately the center point along the filter media. Preferably the outer two support bands 120 and 124 are spaced apart from the end caps of the filter media such that fluid flow through the filter media is allowed between the outer support bands and the end caps. This also allows the end caps to be securely adhesively fixed to the ends of the filter media, as previously described.

The support bands are preferably formed from an imperforate thermoplastic material such as nylon, or can be comprised of a fibrous filter material such as described previously with respect to the support wrap. Again, it is preferred that the material is combustible or biodegradable so as to be easily disposed of in a landfill. Also, the support bands preferably have the same thickness as the support wrap described previously (0.030 inches), and are joined to the inner peak pleats of the filter media such as by depositing a bead or layer of adhesive along the outer surface of the bands.

As with the support wrap, the support bands provide structural integrity for the pleats on the filter element, and more specifically, prevent the pleats from moving relative to one another such that the filter element retains its cylindrical form. The support bands also allow the filter element to be easily located over the inner support core 18 as the bands have a smooth inner surface which is easily slid over the core, and prevent the pleats from directly contacting the core. The bands also act as spacers to allow the end cap 24 to slide pass the support core when inserting the filter element over the core. The number, spacing and width of the support bands can be chosen depending upon the particular application, and can be determined by simple experimentation.

The filter element can be assembled in much the same manner as described previously, with the support bands being disposed around the mandrel and a layer of adhesive applied to the outer surface of the support bands, with the pleated or corrugated filter media then disposed in a cylinder form around the bands. While the support bands are disclosed as extending annularly around the inside surface of the filter media, it is also within the scope of present invention to provide one or more support bands in a spiral or helical fashion circumferentially around the inside surface of the filter media, as along as the support band(s) provide sufficient strength and integrity for the filter element.

In either of the embodiments described above, the present invention provides a novel and unique coreless filter element which can be easily located over a support core integral with a filter housing, and removed from the support core and replaced when necessary. According to either of the embodiments described above, the support wrap or band(s) provide integrity and strength for the pleated filter media without requiring an outer wrap surrounding the filter element, and can be easily manufactured using common techniques. Finally, the filter element of the present invention is particularly designed with incineratable or biodegradable components which can be disposed of in a commercial landfill.

The principles, preferred embodiments and modes of operation of the present invention have been described in the foregoing specification. The invention which is intended to be protected herein should not, however, be construed as limited to the particular form described as it is to be regarded as illustrative rather than restrictive. Variations and changes may be made by those skilled in the art without departing from the scope and spirit of the invention as set forth in the appended claims.

What is claimed is:

1. A filter element, comprising:

cylindrical filter media circumscribing a central axis and having longitudinally-extending pleats extending from one end of the filter media to another end of the filter media, said pleats having radially-inner pleat peaks, radially-outer pleat peaks, and opposing sidewalls extending between respective inner and outer pleat peaks which define outwardly-opening pleat cavities around the filter element, a radially-inner surface of the inner pleat peaks bounding a central, longitudinally-extending imaginary cylindrical cavity within the filter media, an inner cylindrical support wrap formed from a layer of porous, fibrous filter media disposed within the central cavity and having a radially outer surface adhesively joined to the radially-inner surface of the inner pleat peaks, and an end cap with an annular cap portion bonded to each end of the filter media, at least one of said end caps having a central circular opening enabling a rigid support core to be inserted into and removed from the cylindrical cavity of the filter media, said central circular opening of said at least one end cap having an inner diameter that is substantially equal to an inner diameter of the support wrap.

2. The filter element as in claim 1, wherein a mass of adhesive is disposed between and against the outer surface of the support wrap and the inner pleat peaks.

3. The filter element as in claim 2, wherein said mass of adhesive is provided in a bead between the support wrap and the inner pleat peaks.

4. The filter element as in claim 2, wherein said mass of adhesive is applied continuously across the outer surface of the support wrap.

5. The filter element as in claim 1, wherein said support wrap comprises a wrap of flexible material having circumferential ends which are in overlapping adjacent relation to one another.

6. The filter element as in claim 1, wherein said support wrap has a permeability of at least 10 times the permeability of the filter media.

7. The filter element as in claim 1, wherein said support wrap is formed from non-metallic material.

8. The filter element as in claim 7, wherein said support wrap is formed from spun bonded material.

9. The filter element as in claim 8, wherein said support wrap is formed from polyester.

10. The filter element as in claim 8, wherein said support wrap is formed from non-woven filaments.

11. The filter element as in claim 1 wherein said annular cap portion of said at least one of said end caps is imperforate.

12. The filter element as in claim 11, wherein each end cap includes an annular cap portion having a central opening, and a sealing element is carried by each end cap and bounds each opening and projects radially-inward into the respective opening.

13. The filter element as in claim 12, wherein each of said end caps includes a radially-inward facing groove around the central opening to each end cap, and an resilient O-ring seal is disposed within each groove.

14. The filter element as in claim 1, wherein said filter media comprises a multi-layered structure having i) an outer layer of a support mesh, ii) an adhesive web layer disposed adjacent a radially inner surface of the support mesh, iii) a microfiber capacity layer disposed adjacent a radially inner surface of the adhesive web layer, iv) a microfiber filtration layer disposed adjacent a radially inner surface of the capacity layer, and v) an inner layer of a support mesh disposed adjacent a radially inner surface of the filtration layer.

15. The filter element as in claim 1, wherein the outer pleat peaks are self-supporting and freely-moveable with respect to one another.

16. The filter element as in claim 1, wherein said support wrap is spaced from said filter media between said inner pleat peaks, and is joined only to the inner pleat peaks.

17. The filter element as in claim 1, wherein said at least one of said end cap includes a radially inward-facing groove around the central opening, and a resilient O-ring seal is disposed within the groove in said at least one of said end caps and projects radially-inward into the opening.

18. The filter assembly as in claim 1, further including a plurality of inner cylindrical support wraps, each formed from a layer of porous, fibrous filter media disposed within the central cavity and having a radially outer surface adhesively joined to the radially-inner surface of the inner pleat peaks.

19. A filter assembly, comprising:

a fluid conduit, a cylindrical perforated metal support core fixed to said fluid conduit and extending longitudinally therefrom, a cylindrical filter element circumscribing a central axis and removably received over said support core, said filter element including filter media having longitudinally-extending pleats extending from one end of the filter element to another end of the filter element, said pleats having radially-inner pleat peaks, radially-outer pleat peaks, and opposing sidewalls extending between respective inner and outer pleat peaks which define outwardly-opening pleat cavities around the filter element, a radially-inner surface of the inner pleat peaks bounding a central, longitudinally-extending imaginary cylindrical cavity within the filter media, an inner cylindrical support wrap formed from a layer of porous, fibrous filter media disposed within the central cavity between said radially inner pleat peaks and the support core, and having a radially outer surface adhesively joined to the radially-inner surface of the inner pleat peaks, said support wrap being the inner-most layer in the filter element and forming a cylindrical cavity to closely receive the support core, the support wrap preventing damage to the pleats when the filter element is received over and removed from the support core, and an end cap with an annular cap portion bonded to each end of the filter media, at least one of said end caps having a central circular opening receiving the support core, said central circular opening of said at least one end cap having an inner diameter that is substantially equal to an inner diameter of the support wrap.

20. The filter assembly as in claim 19, wherein a mass of adhesive is disposed between and against the outer surface of the support wrap and the inner pleat peaks.

21. The filter assembly as in claim 20, wherein said mass of adhesive is provided in a bead between the support wrap and the inner pleat peaks.

22. The filter assembly as in claim 20, wherein said mass of adhesive is applied continuously across the outer surface of the support wrap.

23. The filter assembly as in claim 19, wherein said support wrap comprises a wrap of flexible material having circumferential ends which are in overlapping adjacent relation to one another.

24. The filter assembly as in claim 19, wherein said support wrap has a permeability of at least 10 times the permeability of the filter media.

25. The filter assembly as in claim 19 wherein said support wrap is formed from non-metallic material.

26. The filter assembly as in claim 25, wherein said support wrap is formed from spun bonded material.

27. The filter assembly as in claim 26, wherein said support wrap is formed from polyester.

28. The filter assembly as in claim 26, wherein said support wrap is formed from non-woven filaments.

29. The filter assembly as in claim 19 wherein said at least one of said end caps fluidly seals against the support core.

30. The filter assembly as in claim 29, wherein said at least one end cap includes a sealing element is carried by the at least one end cap and bounds the central opening and projects radially-inward into the opening to seal against a radially-outer surface of the support core.

31. The filter assembly as in claim 30, wherein said one end cap includes a radially-inward facing groove around the central opening, and an resilient O-ring seal is disposed within said groove in sealing relation to the outer surface of the support core.

32. The filter assembly as in claim 19, wherein said filter media comprises a multi-layered structure having I) an outer layer of a support mesh, ii) an adhesive web layer disposed adjacent a radially inner surface of the support mesh, iii) a microfiber capacity layer disposed adjacent a radially inner surface of the adhesive web layer, iv) a microfiber filtration layer disposed adjacent a radially inner surface of the capacity layer, and v) an inner layer of a support mesh disposed adjacent a radially inner surface of the filtration layer.

33. The filter assembly as in claim 19, wherein the outer pleat peaks are self-supporting and freely moveable with respect to one another.

34. The filter assembly as in claim 19, wherein said support wrap is spaced from said filter media between said inner pleat peaks, and is joined only to the inner pleat peaks.

35. The filter assembly as in claim 19, wherein said metal support core is removably attached to said housing.

36. The filter assembly as in claim 35, wherein said metal support core has an end portion which receives the fluid conduit and is fluidly sealed thereto.

37. The filter assembly as in claim 19, wherein said support wrap has a radially inner surface adjacent said support core, and an opposite, radially outer surface adjacent said radially inner surface of the inner pleat peaks.

38. The filter assembly as in claim 19, further including a plurality of inner cylindrical support wraps, each formed from a layer of porous, fibrous filter media disposed within the central cavity and having a radially outer surface adhesively joined to the radially-inner surface of the inner pleat peaks.

39. A coreless filter element removeably positionable within a housing including a perforated rigid support core, said filter element comprising:

cylindrical filter media circumscribing a central axis and having longitudinally-extending pleats extending from one end of the filter media to another end of the filter media, said pleats having inner pleat peaks, outer pleat peaks, and opposing sidewalls extending between respective inner pleat peaks and outer pleat peaks which define outwardly-opening pleat cavities around the filter element, a radially-inner surface of the inner pleat peaks bounding a central, longitudinally-extending imaginary cylindrical cavity within the filter media, and inner flexible cylindrical support means of a porous fibrous filter media disposed within the cylindrical cavity of the filter media as the innermost layer of the filter element, and having a radially outer surface adhesively joined to the radially-inner surface of the inner pleat peaks for providing structural integrity for the pleats and preventing the inner pleat peaks from moving with respect to one another, said support means enabling said filter element to be located over the rigid support core for filtering fluid passing through the housing, and removed from the support core when the filter element is spent without damage to the pleats, and an end cap with an annular cap portion bonded to each end of the filter media, at least one of said end caps having a central circular opening enabling the support core to be inserted into and removed from the cylindrical cavity of the filter media, said central circular opening of said at least one of said end caps having an inner diameter that is substantially equal to an inner diameter of the support means.

40. The filter element as in claim 39, wherein said support means comprises a cylindrical support wrap.

41. The filter element as in claim 39, wherein said support means comprises a plurality of elongated, flat support bands spaced along the longitudinal extent of the filter media.

42. The filter element as in claim 41, wherein each of said support bands extends in an annulus.

43. The filter element as in claim 41, wherein a mass of adhesive bonds each of said support bands to the filter media.

44. The filter element as in claim 41, wherein each of said support bands is formed from fibrous material.

45. The filter element as in claim 44, wherein each of said support bands is formed from non-woven filaments.

46. The filter element as in claim 39, further including a sealing element disposed around the central opening in said at least one of said end caps and projecting radially-inward into the opening to seal against the core when the filter element is received over the core, the support means forming a cylindrical cavity to closely receive the support core, the support means preventing damage to the pleats when the filter element is received over and removed from the core.

47. The filter element as in claim 46, wherein said one end cap has a radially inward-facing groove around the central opening, and the resilient annular sealing element is disposed within the groove in said one end cap and projects radially-inward into the opening.

48. The filter element as in claim 47, wherein said annular sealing element comprises an O-ring.

49. An assembly comprising the filter element as in claim 39, and a housing including a perforated rigid support core, whereby the filter element can be easily located over and removed from the support core without damage to the pleats.

50. A filter assembly, comprising:

a fluid conduit, a cylindrical perforated metal support core removeably attached to said fluid conduit and extending longitudinally therefrom, said support core including an end portion which receives the fluid conduit of the housing in surrounding relation thereto, said metal support core including a radially inward facing groove, and an O-ring is disposed in the groove for fluidly-sealing against an outer surface of said fluid conduit, a cylindrical filter element circumscribing a central axis and removably received over said support core, said filter element including filter media having longitudinally-extending pleats extending from one end of the filter element to another end of the filter element, said pleats having radially-inner pleat peaks, radially-outer pleat peaks, and opposing sidewalls extending between respective inner and outer pleat peaks which define outwardly-opening pleat cavities around the filter element, a radially-inner surface of the inner pleat peaks bounding a central, longitudinally-extending imaginary cylindrical cavity within the filter media, and an inner cylindrical support wrap formed from a layer of porous, fibrous filter media disposed within the central cavity between said inner pleat peaks and the support core, and having a radially outer surface joined to the radially-inner surface of the inner pleat peaks.

51. The filter assembly as in claim 50, further including a plurality of inner cylindrical support wraps, each formed from a layer of porous, fibrous filter media disposed within the central cavity and having a radially outer surface adhesively joined to the radially-inner surface of the inner pleat peaks.

52. A filter assembly, comprising:

a first fluid conduit and a second fluid conduit, said second fluid conduit spaced longitudinally from said first fluid conduit and disposed co-axial with said first fluid conduit, a cylindrical perforated metal support core attached to said first fluid conduit in surrounding relation to said first fluid conduit and extending longitudinally toward said second fluid conduit, said support core being longitudinally spaced apart from said second fluid conduit, a cylindrical filter element circumscribing a central axis and removably received over said support core, said filter element including filter media having longitudinally-extending pleats extending from one end of the filter element to another end of the filter element, said pleats having radially-inner pleat peaks, radially outer pleat peaks, and opposing sidewalls extending between respective inner and outer pleat peaks which define outwardly-opening pleat cavities around the filter element, a radially-inner surface of the inner pleat peaks bounding a central, longitudinally-extending imaginary cylindrical cavity within the filter media, and an inner cylindrical support wrap formed from a layer of porous, fibrous filter media disposed within the central cavity between said inner pleat peaks and the support core, and having a radially outer surface joined to the radially-inner surface of the inner pleat peaks, and an end cap with an annular cap portion bonded to each end of the filter media, at least one of said end caps having a central circular opening enabling the support core to be inserted into and removed from the cylindrical cavity of the filter media, said central circular opening of said at least one of said end caps having an inner diameter that is substantially equal to an inner diameter of the support wrap.

53. The filter assembly as in claim 52, wherein each of said end caps includes a central circular opening, one of said end caps fluidly sealing against the support core, and the other of said end caps fluidly sealing against the second fluid conduit.

54. The filter assembly as in claim 53, wherein a first sealing element is carried by the one end cap and bounds the central opening in the one end cap and is sealed against an outer surface of the support core, and said other of said end caps also includes a second sealing element is carried by the other end cap and bounds the central opening in the other end cap and is sealed against an outer surface of the second fluid conduit.

55. The filter assembly as in claim 54, wherein said one end cap includes a radially-inward facing groove around the central opening in the first end cap, and a first resilient O-ring seal is disposed within said grove in sealing relation to the outer surface of the support core, and said other end cap also includes a radially-inward facing groove around the central opening in the other end cap, and a second resilient O-ring seal is disposed within said groove in said other end cap in sealing relation to the outer surface of the second fluid conduit.

56. The filter assembly as in claim 55, wherein said one end cap includes an annular flange extending axially away from the annular disk along the radially inner surface of the filter media.

57. The filter assembly as in claim 56, wherein said support wrap has a thickness in the radial direction about the same as the radial thickness of the annular flange on the one end cap.

58. The filter assembly as in claim 52, further including a plurality of inner cylindrical support wraps, each formed from a layer of porous, fibrous filter media disposed within the central cavity and having a radially outer surface adhesively joined to the radially-inner surface of the inner pleat peaks.

* * * * *